United States Patent [19]

Martin et al.

[11] 4,041,572

[45] Aug. 16, 1977

[54] ANATOMICAL SECTION DE-BONING MACHINE

[75] Inventors: Eugene G. Martin; Dale M. Risser, both of Ephrata, Pa.

[73] Assignee: Victor F. Weaver, Inc., New Holland, Pa.

[21] Appl. No.: 726,982

[22] Filed: Sept. 27, 1976

[51] Int. Cl.² .............................................. A22C 17/04
[52] U.S. Cl. ......................................... 17/46; 17/1 G
[58] Field of Search .............................. 17/1 G, 11, 46

[56] References Cited

U.S. PATENT DOCUMENTS

| | | | |
|---|---|---|---|
| 3,261,054 | 7/1966 | Kaplan et al. | 17/1 G |
| 3,348,261 | 10/1967 | Segur | 17/1 G |
| 3,510,908 | 5/1970 | Segur et al. | 17/1 G |
| 3,629,903 | 12/1971 | Turner | 17/1 G |
| 3,672,000 | 6/1972 | Martin et al. | 17/1 G |
| 3,708,828 | 1/1973 | Cain et al. | 17/1 G |
| Re. 27,873 | 1/1974 | Weits et al. | 17/1 G |

Primary Examiner—Louis G. Mancene
Assistant Examiner—Paul J. Hirsch

Attorney, Agent, or Firm—Samuel M. Learned, Jr.

[57] ABSTRACT

A de-boning machine having a plurality of similar operational heads respectively designed to receive and mechanically engage a centrally-extending elongated meat-encased bone member characterized by having a single shaft and at the respective longitudinal ends thereof a ball or a socket structure comprising part of a ball-and-socket joint, exemplary of which would be the bone in a chicken thigh or the like, and thereafter by a sequential camming activation of cutting and peeling blades of the respective operational heads, while the heads are being operationally driven, automatically effect an annular severing of the encasing meat about the elongated bone shaft at that end thereof immediately interior of the socket structure, and then initiate a longitudinal removal of the encasing meat from the bone shaft by inversely peeling the encasing meat upon itself along the bone shaft length, then moving the peeled meat around the ball structure at the opposite end of the elongated bone shaft, after which the meat retaining tendons are severed and a complete removal of the meat from the bone is accomplished.

31 Claims, 31 Drawing Figures

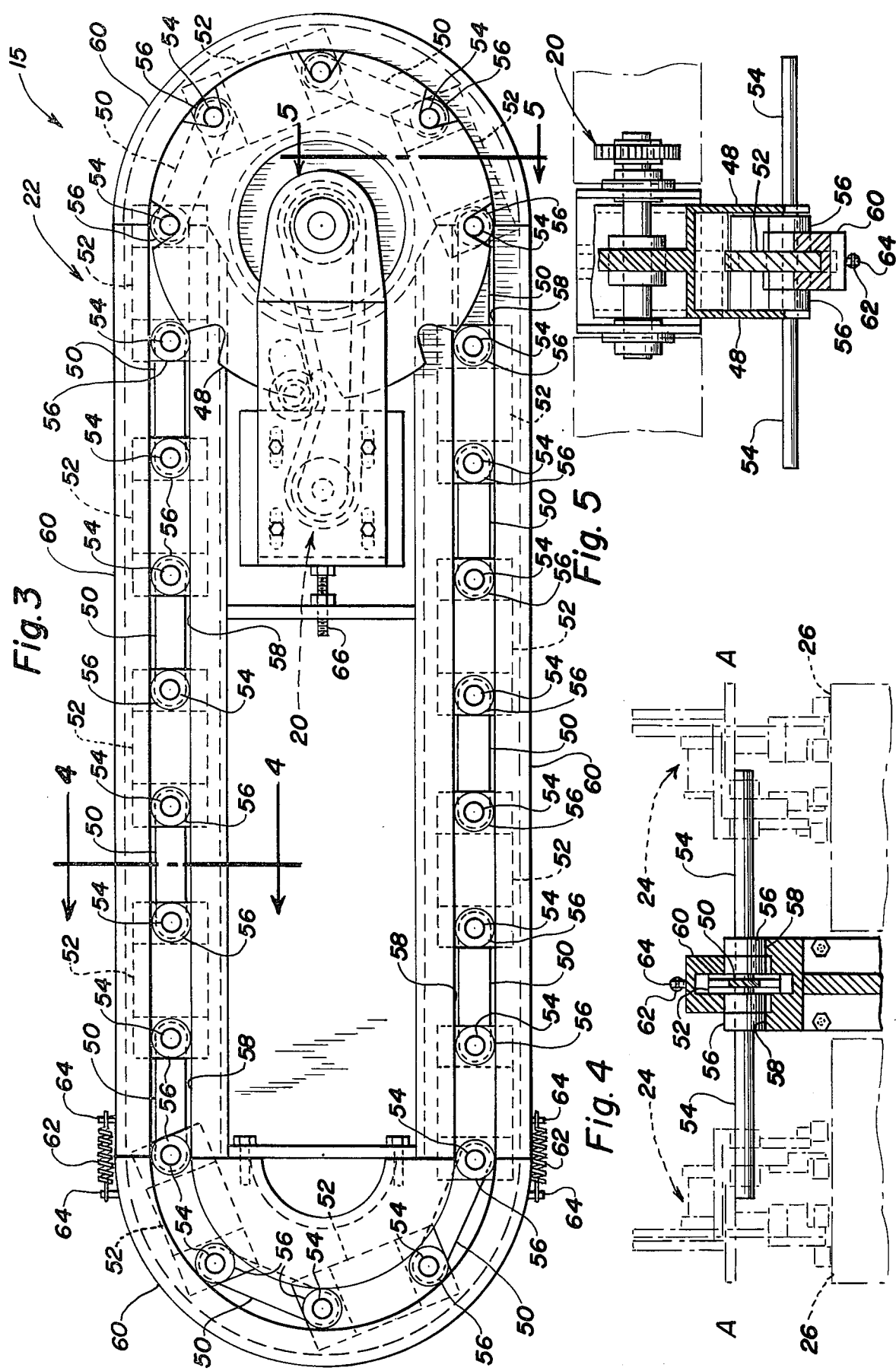

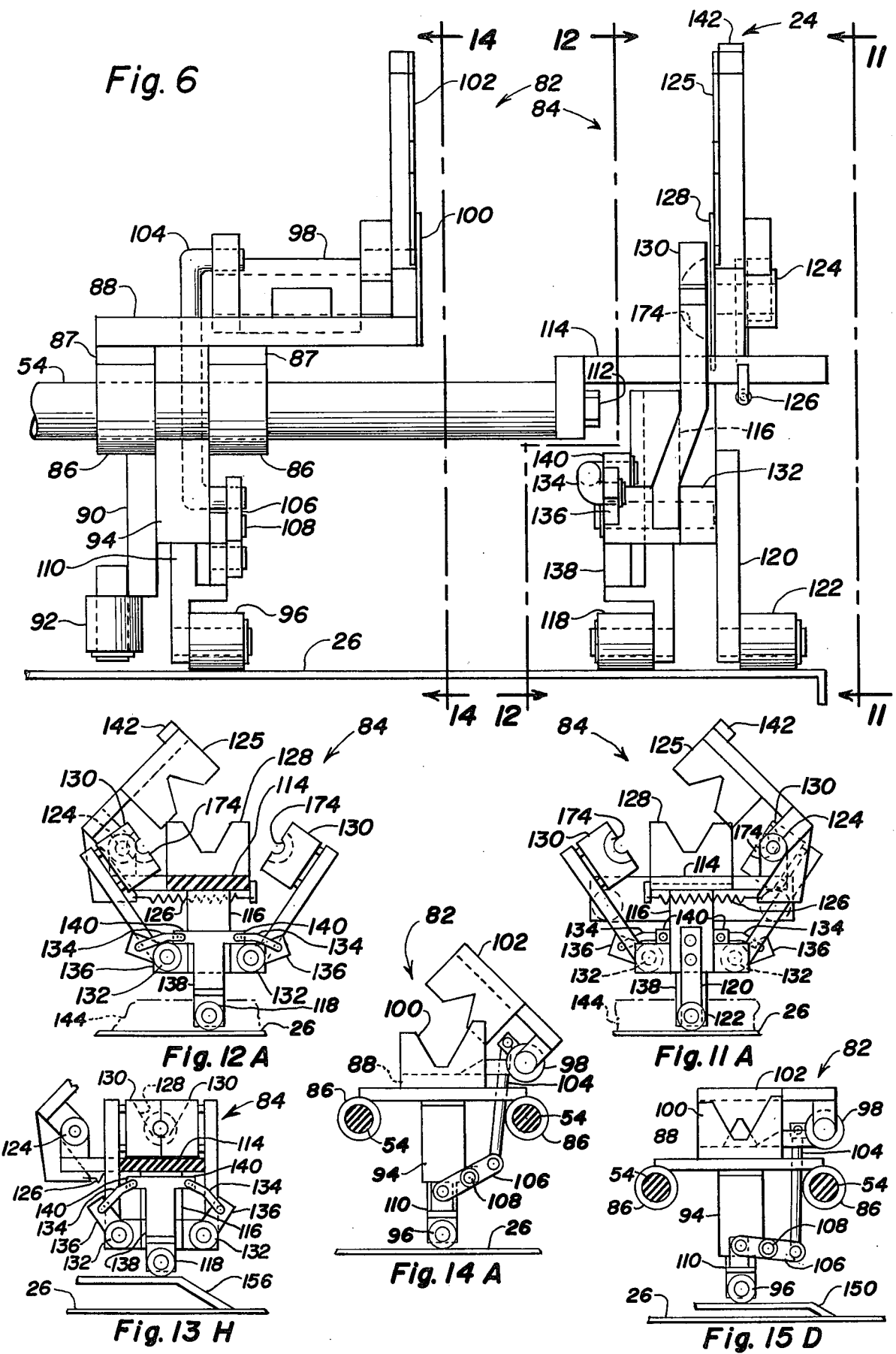

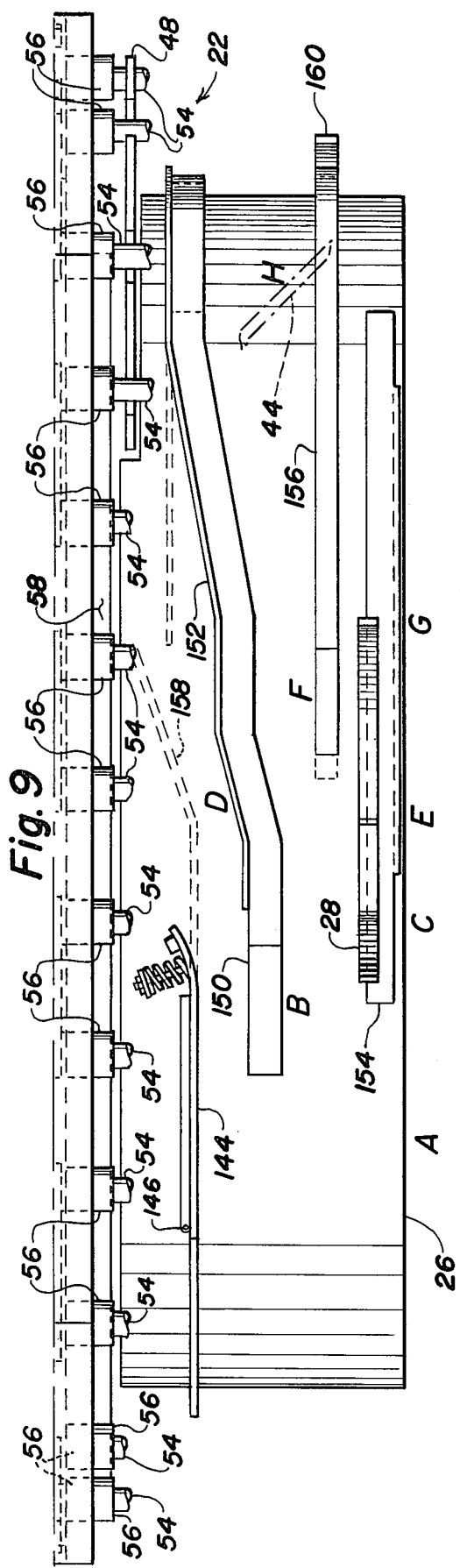
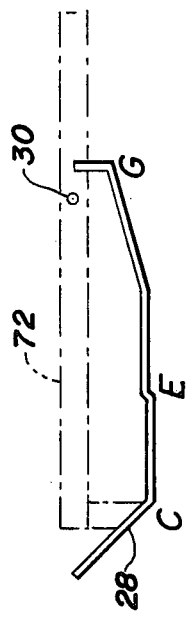
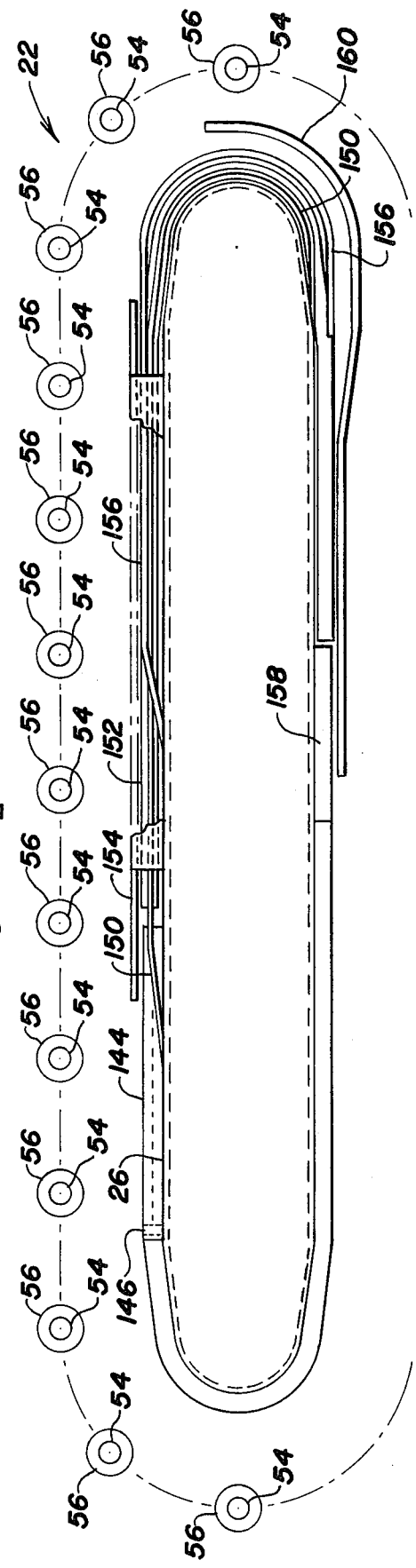
Fig. 9
Fig. 10

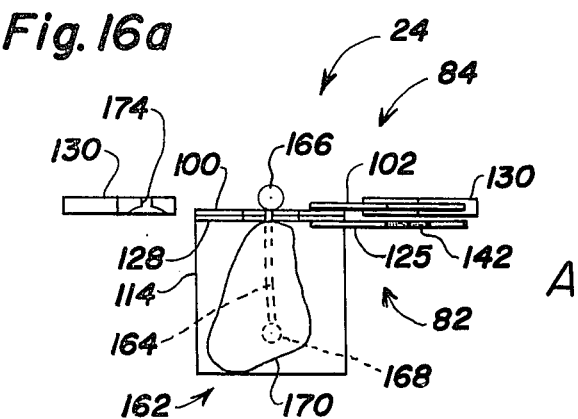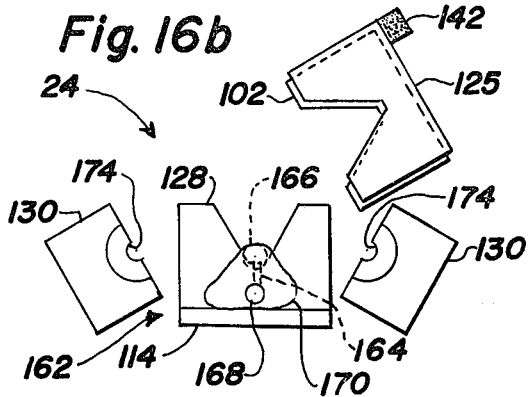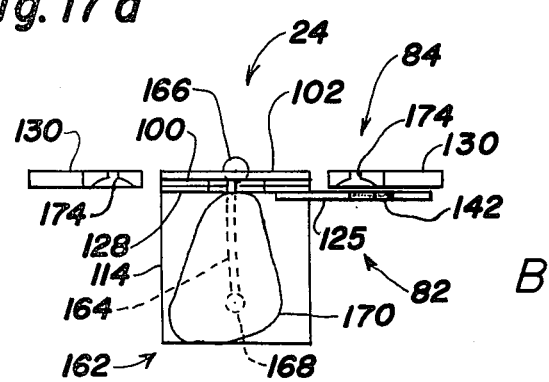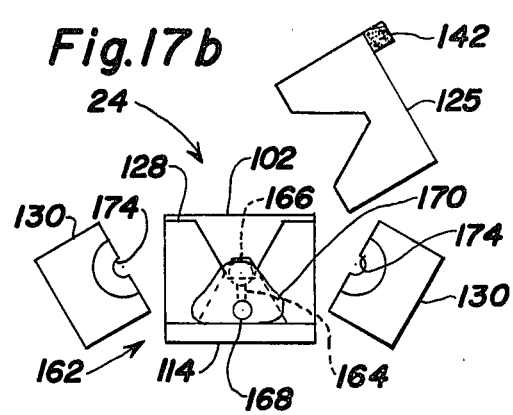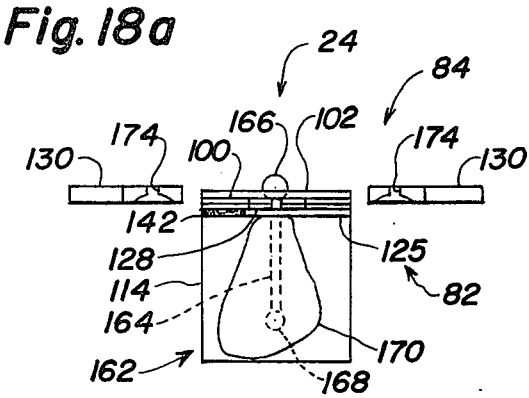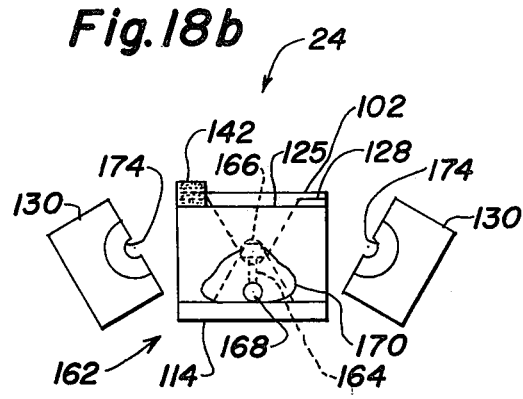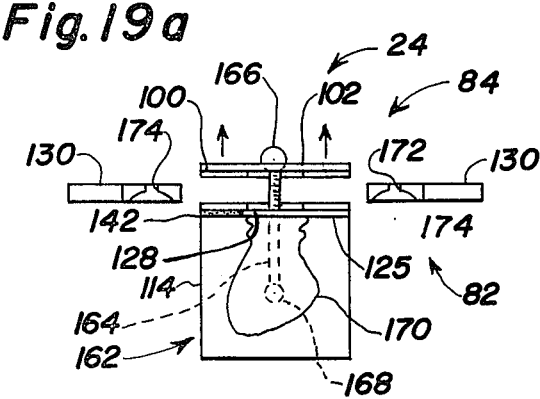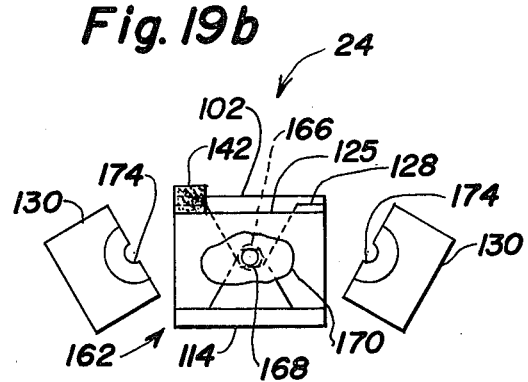

ANATOMICAL SECTION DE-BONING MACHINE

BACKGROUND OF THE INVENTION

It is to be understood that the instant invention pertains to a machine for automatically de-boning appendicular anatomical sections of small edible animals such as rabbits, and fowl of various types which would include but not be limited to old and young chickens, turkeys, geese, ducks and guineas, or an appendicular section of any small edible animal wherein said section is anatomically characterized by having a centrally extending elongated meat encased bone shaft and at the respective ends thereof a ball or a socket structure comprising the ball or socket parts of a ball-and-socket joint, exemplary only of which appendicular anatomical sections would be the thigh or upper arm wing section of domesticated poultry or the like.

Traditionally, in view of the relatively fragile bone structure of fowl and other small edible animals, as well as the practical mechanical handling difficulty encountered in automatically removing either raw or pre-cooked meat from appendicular anatomical sections of small edible animals, wherein said sections have a centrally extending elongated meat encased bone shaft with a ball or socket protuberance at the respective opposite ends thereof, without contaminating the meat removed therefrom with either scraped or broken bone fragments, meat peeling and removal operations involving said sections have generally been limited to various manual and/or a combination of manual and relatively simple manually operated mechanical means. Exemplary prior art disclosures which teach the combined manual and manually operated mechanical means removal of meat from an appendicular anatomical section as heretofore characterized would be those as set forth in U.S. Pat. No. 3,192,557 to Segur, dated July 6, 1965, and U.S. Pat. No. 3,629,903 to Turner, dated Dec. 28, 1971, wherein both of the aforementioned disclosures teach static fixtures which are employed to facilitate the manual removal of meat. In a subsequent disclosure by Segur as taught in U.S. Pat. No. 3,348,261 dated Oct. 24, 1967, there is shown a manually operated mechanical means employed to plow the meat off a poultry leg after the meat thereon has been longitudinally sliced to the bone along at least one side of the leg section.

Upon advent of the convenience food market there has been given rise to an increasing need for improved machinery which provides high-speed automatic de-boning capabilities for various foodstuffs, particularly poultry, and more particularly chickens, to provide de-boned pieces which are easily prepared and served, as well as providing specialty pieces for commercially prepared food service or restaurant menu features, or retail sales features of loose or packaged fresh or frozen all-meat pieces, or packaged pre-cooked convenience meal preparations. Exemplary of the most pertinent disclosures teaching automated de-boning of appendicular anatomical sections of small edible animals are those as taught in U.S. Pat. No. 3,261,054 to Kaplan et al, dated July 19, 1966, which shows a poultry processing machine for automatically removing thigh and drumstick meat from poultry leg bones as the entire leg member is subjected to a meat stripping mechanism comprised of a pair of oppositely disposed resiliently mounted stripping bars mechanically cooperating with a suspension hook conveyance system, as well as that disclosure taught in U.S. Pat. No. 3,672,000 to Martin et al, dated June 27, 1972, showing a machine for automatically removing the bone from a chicken thigh by mechanically engaging the ball at one end of the thigh bone and then by means of engagement of the thigh section by stripping blades, and the longitudinal movement of said stripping blades effect a removal of the meat from the bone. Other disclosures of a pertinent nature which also generally teach automated de-boning of appendicular anatomical sections of small edible animals would include U.S. Pat. No. 3,457,586 dated July 29, 1969, and U.S. Re. Pat. No. 27,873 dated Jan. 8, 1974, respectively to Zwiep et al and Weits et al, showing in both a machine for heavy-duty de-boning applications such as removing bones from hams, beef shoulders and legs, and the like, wherein the functional apparatus employed is a variable opening dull edge rotary plow mechanism comprised of a plurality of blades which are automatically adjusted by means of a cam follower that rides the contour of the bone from which the meat is plowably removed by means of said blades. In U.S. Pat. No. 3,510,908 to Segur et al, dated May 12, 1970, dual slotted fixture devices for removal of meat, as disclosed generally in the earlier of the aforementioned Patents to Segur, are shown in combination with cooperating retractible bone clamping means each of which engages bone at one end thereof and as the respective clamp means retract the bone is drawn through one of a selected slot in the corresponding fixture device and the meat is mechanically stripped from the bone in a manner similar to that as was previously accomplished by a combined manual/mechanical operation.

The instant invention, in view of the aforementioned pertinent prior art as well as also in view of the other disclosures cited hereinbefore or any combination thereof, is patentably distinguishable thereover in that the instant invention has utility features and new and useful advantages, applications, and improvements in the art of automatically de-boning appendicular anatomical sections of small edible animals by means not heretofore disclosed, as set forth hereinafter.

SUMMARY OF THE INVENTION

It is the principal object of the present invention to provide an automatic de-boning machine having a plurality of operational heads for individually engaging and removing either raw or cooked meat from various of small edible animal appendicular anatomical sections characterized by having a centrally-extending elongated meat-encased bone member with protuberance at either end thereof, being at one end a ball comprising part of a ball-and-socket joint and at the other end a socket comprising part of another ball-and-socket joint, wherein the respective operational heads of said machine utilize gripping means to engage and hold the elongated bone member immediately inward of the larger of the two protuberances thereon and reciprocally operating blade means which function to engage and annularly sever the meat thereon into the elongated bone member shaft directly adjacent to said gripping means and thereafter by use of camming means maintain said blade means in proximate coaxial engagement with said elongated bone member shaft and employ additional camming means to move said blade means longitudinally a discrete distance along said elongated bone shaft to cleanly initiate the inverse peeling of the encasing meat therefrom while simultaneously initiating the formation of a circumferential meat-membrane bushing about said elongated bone shaft which bushing thereafter facilitates the subsequent meat peeling operation, and then auxiliary detented peeling blade means camably operated to engage and complete meat peeling rearwardly over the smaller of said two protuberances of said elongated bone member opposite of the end from which said bone is gripped, and means to sever the meat retaining tendons holding the peeled meat thereto, all of which is accomplished without damaging the machine or shearing or shattering said elongated bone member or either of the bone protuberances at either of the ends thereof.

Another object of the present invention is to provide a de-boning machine of the type described which delivers a de-boned meat product absent bone fiber contamination otherwise resultant from bone shaft scraping during the meat peeling operation.

Still another object of the present invention is to provide a de-boning machine of the type described the same of which embodies an effective and efficient oppositely cooperative and mutually co-related plurality of cam operated operational heads on each side of said machine each of which operational heads respectively engage an elongated meat-encased bone member as heretofore characterized and, excepting for an initial individual manual loading of each of said elongated meat-encased bone members respectively into said operational heads of said machine, effect a completely automatic meat peeling operation.

Yet another object of the present invention is to provide a de-boning machine of the type described the same of which embodies dual safety stopping means, one of which safety stopping means functions automatically and instantaneously to stop all operations of said machine in the event of a jamming overload of said machine resultant from any source including machine malfunction, product or operator causes, and the other of which safety stopping means provides a highly accessible operator initiated "panic bar" readily and equally to either of both manual loading operators thereby enabling individual manually initiated instantaneous stopping of said machine for any other reason.

A further object of the instant invention is to provide a high-speed automatic de-boning machine of the type described which mechanically consolidates functions that have heretofore been relatively time-consuming and separate mechanically or manually accomplished de-boning operations.

It is still another object of the instant invention to provide a de-boning machine of the type described which is safe and simple in operation, as well as a machine which requires a minimum of make-ready time in addition to a machine which may be set and operated by an average employee not possessed of special skill or training.

Yet another object of the instant invention is to provide a de-boning machine of the type described which is sanitary in operation and easily accessible for quick and thorough cleaning.

Still another object of the instant invention is to provide a de-boning machine of the type described which provides means to accommodate elongated meat-encased bone members of different bone diameters.

Yet still another object of the instant invention is to provide a de-boning machine of the type described having suitable means to initially hold but subsequently release the peeled meat from the holding means at a suitable discharge station, and also having means to release the peeled bone member from the gripping means at a suitable discharge station, wherein release of both the peeled meat and peeled bones is accomplished during uninterrupted operational movement of all operational heads respectively on both sides of said machine.

Details of the foregoing objects and of the invention, as well as other objects thereof, are set forth in the following specification and illustrated in the accompanying drawings comprising a part thereof.

BRIEF DESCRIPTION OF THE DRAWINGS

FIG. 3 is an enlarged fragmentary side sectional elevation showing the chain drive means of the machine as seen generally along the line 3—3 of FIG. 2.

FIG. 4 is an enlarged end sectional view of a chain drive link member as seen along the line 4—4 of FIG. 3, and showing in phantom the installation of a set of operational heads.

FIG. 5 is an enlarged fragmentary end sectional view of the chain drive and a chain drive link member as seen along the line 5—5 of FIG. 3.

FIG. 6 is an enlarged end view of an operational head in the extended position.

FIG. 9 is an enlarged top plan view of the operational head cam table and relative cam configuration on one operational side of the subject machine.

FIG. 10 is a side elevation of the operational head cam table and relative cam configurations as shown in FIG. 9, and showing more specifically the operational head overhead "shoe cam" and the relative machine position thereof with respect to elevation above said cam table.

FIG. 11 is a scaled down front elevation of the forward operational head element as seen along the line 11—11 of FIG. 6.

FIG. 12 is a scaled down rear elevation of the forward operational head element as seen along the line of 12—12 of FIG. 6.

FIG. 13 is the same view as seen in FIG. 12, except showing the peeling blades and the linkage assembly thereof cammed into the closed position.

FIG. 14 is a scaled down front elevation of the rear operational head element as seen along the line 14—14 of FIG. 6.

FIG. 15 is the same view as seen in FIG. 14, except showing the clamping blades and linkage assembly thereof cammed into the closed position.

FIG. 16a and FIG. 16b illustrate respectively a simplified top plan view and a front elevation view of the operational head clamping and peeling blade assemblies in the load position as would be the configurations thereof at cam position A as seen in FIG. 9.

FIG. 17a and FIG. 17b illustrate respectively a simplified top plan view and a front elevation view of the operational head clamping and peeling blade assemblies as would be the configurations thereof at cam position B as seen in FIG. 9.

FIG. 18a and FIG. 18b illustrate respectively a simplified top plan view and a front elevation view of the operational head clamping and peeling blade assemblies as would be the configurations thereof at cam position C as seen in FIG. 9.

FIG. 19a and FIG. 19b illustrate respectively a simplified top plan view and a front elevation view of the operational head clamping and peeling blade assemblies as would be the configurations thereof at cam position D as seen in FIG. 9.

DETAILED DESCRIPTION OF THE INVENTION

Figure 1:
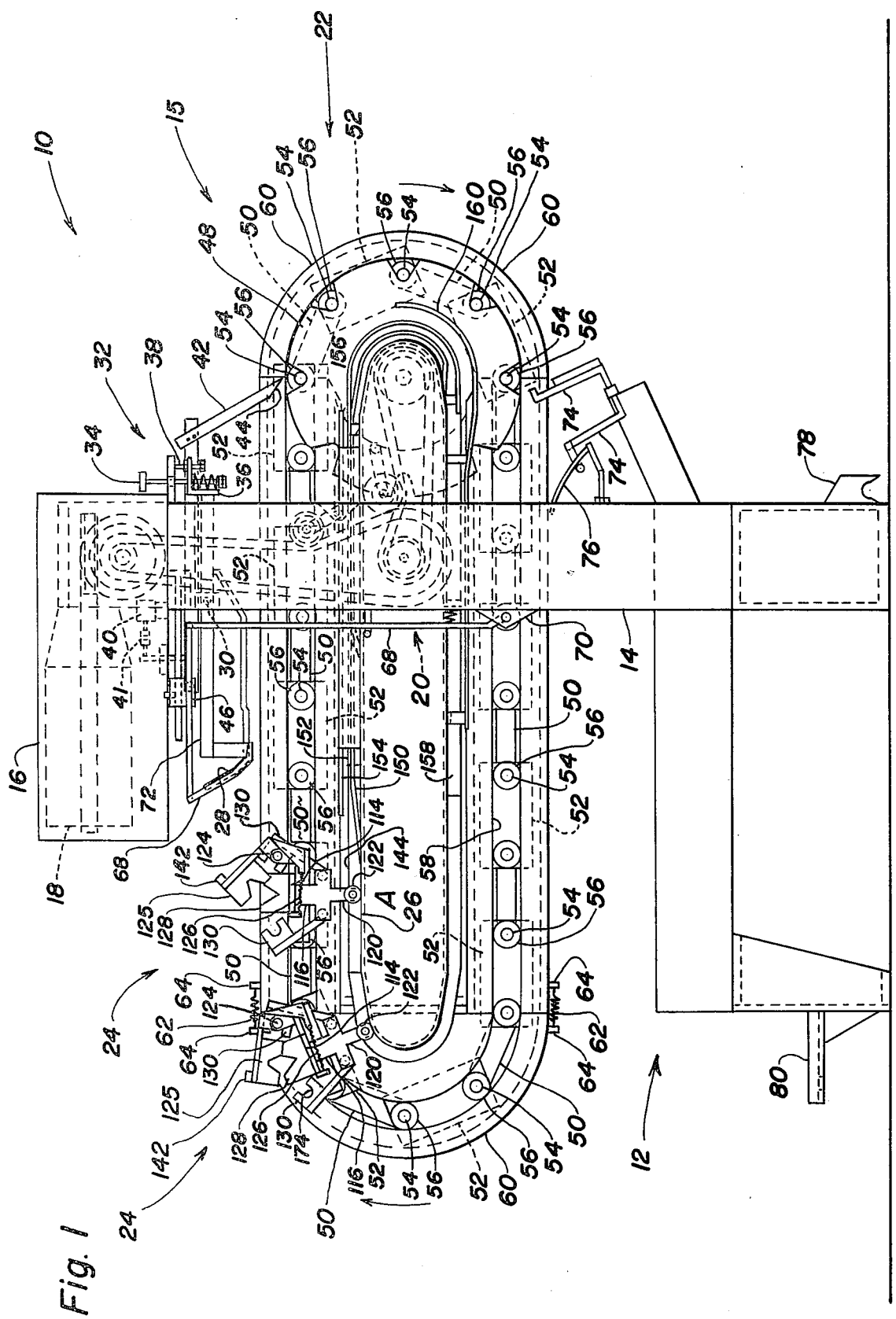
FIG. 1 is a side elevation of the machine comprising the subject matter of the instant invention, showing two sets of operational head assemblies installed thereon.

Referring to FIG. 1, the present invention is shown which comprises an anatomical section de-boning machine 10 having a support frame structure comprised of a base member 12 that has affixed thereto a vertical support member 14 to which in turn is affixed vertically intermediate thereon the operational assembly 15 of said machine 10 and also having affixed at the vertically upper end thereof a motor support cabinet 16 supportably enclosing a motor 18 which powers the operational assembly drive train 20 that in turn drives the operational assembly conveyor 22 by which the operational head assemblies 24 and the respective cam followers thereof are transported through operational engagement with the respective cams on the cam tables 26 and the overhead "shoe cams" 28 whereby the de-boning functions of said operational head assemblies 24 are automatically accomplished.

It should be noted that the operational assembly 15 of said machine 10 is comprised of a single conveyor 22 per se which is driven through a single drive train 20 by a single motor 18, however, said conveyor 22 supports and transports two sets of twelve operational head assemblies 24, one set each of said head assemblies being operationally cycled through respective cams on respective cam tables 26 and overhead "shoe cams" 28 respectively on either lateral side of said machine 10. Therefore, it is to be understood that said machine 10 has identical operational and operator sides respectively lateral thereto, and that the detailed description of machine elements and functions comprising one set of operational head assemblies 24 thereof is equally applicable to the other set of said operational head assemblies 24 thereof. It should be further noted that any particular lot of appendicular anatomical sections to be de-boned will have been obtained from small edible animals of the same species of relatively uniform weight, wherein all of said anatomical sections are comprised of like carcass members, thereby providing a relatively uniform input to which said machine 10 is set.

Referring again to FIG. 1 to explain the details of operation of the present invention. Functionally, there are no machine 10 adjustments per se for either the operational head cam activated de-boning cycle in terms of when the cycle is initiated or otherwise in terms of adjustment for the length of an appendicular anatomical section to be accommodated for de-boning, since both of the aforementioned operational head functions are pre-established by the placement, elevation, and configurations of the respective cams on the cam tables 26, which cam placement, elevation, and configurations it is to be understood have been previously determined to accommodate the expected range of small edible animal appendicular anatomical section lengths to be de-boned, from those of a small rabbit or fowl to those of a large fowl such as a turkey or goose.

Figure 23A:
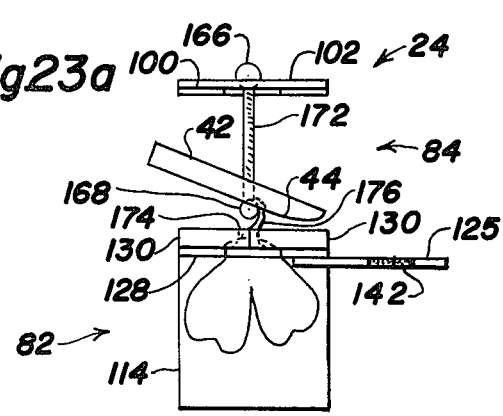
FIG. 23a and FIG. 23b illustrate respectively a simplified top plan view and a front elevation view of the operational head clamping and peeling blade assemblies as would be the configurations thereof at cam position H as seen in FIG. 9.
Figure 23B:
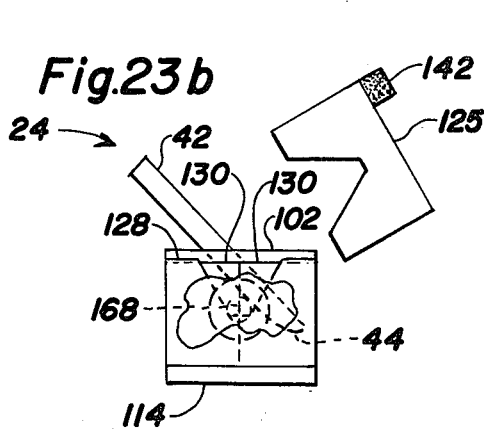

The machine 10 adjustment sets which do need to be made, however, first involve that of threadably adjusting the overhead "shoe cams" 28 pivotally about the pivot pins 30 by means of the overhead cam pressure adjustment assemblies 32 respectively comprised of a spring-loaded adjustment bolt 34 threadably adjustable vertically through a bracket 36 and stop-set by means of a set bolt 38, which adjustments enable an accommodation within the respective sets of operational head assemblies 24 of a particular size bone diameter depending on that particular lot of appendicular anatomical sections comprised of a particular carcass member from a particular species of small edible animal to be processed. Secondly, depending on the overhead "shoe cams" pivotal adjustment aforementioned, the automatic stop switch 40 is then adjusted by threaded means 41 so that the motor 18 will be automatically stopped in the event of a processing jam at any time during the engagement of an operational head assembly cam follower with either of the overhead "shoe cams" 28. And, lastly, the tendon severing knives 42 are laterally adjusted by shim means not shown so that the respective knife blades 44, as more particularly illustrated in FIG. 23a to be described and discussed in greater detail hereinafter, will engage and sever the bone-to-meat retaining tendon and tissue from the ball end of the bone as best illustrated in FIG. 23a. The respective severing knife blade cutting resistances are adjustably set by means of counterbalances 46. Upon adjustment of the overhead "shoe cams" 28 by means of the overhead cam pressure adjustment assemblies 32, adjustment and setting of the automatic stop switch 40, and lateral setting of the respective tendon severing knives 42, as heretofore described, said machine 10 is functionally made ready for de-boning operations.

As illustrated in FIG. 1, but better shown in FIG. 3, the operational assembly conveyor 22, driven by a channel sprocket wheel 48 in a clockwise direction as indicated, being structurally similar to a "chain saw" chain and guide bar, is comprised of an alternating plurality of bar 50 and block 52 members pivotally joined respectively one to the other at the respective ends thereof by connecting rods 54, wherein said connecting rods 54 additionally serve as axles for the conveyor track guide rollers 56 which ride upon the conveyor track 58, as well as also providing the operational head assembly mounting members, all of which in combination as shown furnishes a guided endless link-belt transport means by which the respective sets of operational head assemblies 24 are functionally cycled.

It should be noted that the respective conveyor track cover members 60 "float" in compressive exterior communication with the plurality of conveyor track guide rollers 56, said conveyor track cover members 60 being maintained in conveyor track guide roller 56 compressive communication by means of cover member tension springs 62 respectively assembled to spring retaining pins 64. Also, proper tension is maintained on the operational assembly conveyor 22 by means of the conveyor tension adjustment and set bolt 66, shown in FIG. 3, which enables the adjustment and setting of a compressive force to provide proper tension set on said operational assembly conveyor 22.

Controls for the machine 10 are primarily housed in the vertical support member 14, but said controls are not shown, the same being well known in the art. Safety control features, however, include an emergency stop switch at the control panel location, in addition to a "panic bar" emergency stop 68 which is equally accessible to operators on either lateral side of said machine 10, said "panic bar" emergency stop 68 being pivotally assembled to the vertical support member 14 respectively at bracket mounts 70 and supportably communicating with the respective switch bars 72 of the overhead "shoe cams" 28 on either lateral side of said machine 10, so that any arcuate deflection of said "panic bar" emergency stop 68 will likewise operate the automatic stop switch 40 and thereby stop the motor 18 of said machine 10.

Other features of machine 10 are shown in FIG. 1, which are not elsewhere illustrated, include the fixed flexible bone stripper fingers 74 which engage and extract any bone remaining in any operational head assembly after completion of de-boning operations, as well as fixed flexible meat stripper fingers 76 which engage and extract any meat remaining affixed to any operational head assembly also after completion of de-boning operations. Additionally shown in FIG. 1 is an axle and wheel mounting bracket 78 which detachably engages an axle and wheel assembly, not shown, thereby facilitating movement of said machine 10 from one location to another, and a tow-motor hookup plate is provided at 80 so that a powered vehicle may be employed to further facilitate movement of said machine 10 from one location to another.

Upon setting the machine 10 in accordance with the procedures heretofore described, the operators are ready to commence with de-boning operations. It is to be noted that the operational head assembly 24 position designated as A in FIG. 1, and all subsequent Figures in which such positional designation appears, is the operational head assembly loading position for the respective laterally disposed sets of operational head assemblies of said machine 10. In loading position A, all clamping, cutting, and de-boning components of an operational head assembly 24 are in an open configuration, thereby enabling the manual placement of an anatomical section for de-boning to be positioned therein, i.e., hand loaded, while said machine 10 is at operational speed, after-which the automatic de-boning cycle commences. A specific description of the automatic de-boning cycle, co-relating the cam activated operational head assembly 24 functions with the respective cam configurations and the corresponding de-boning functions accomplished thereby will be described in detail during discussions hereinafter of certain subsequent Figures.

Figure 2:
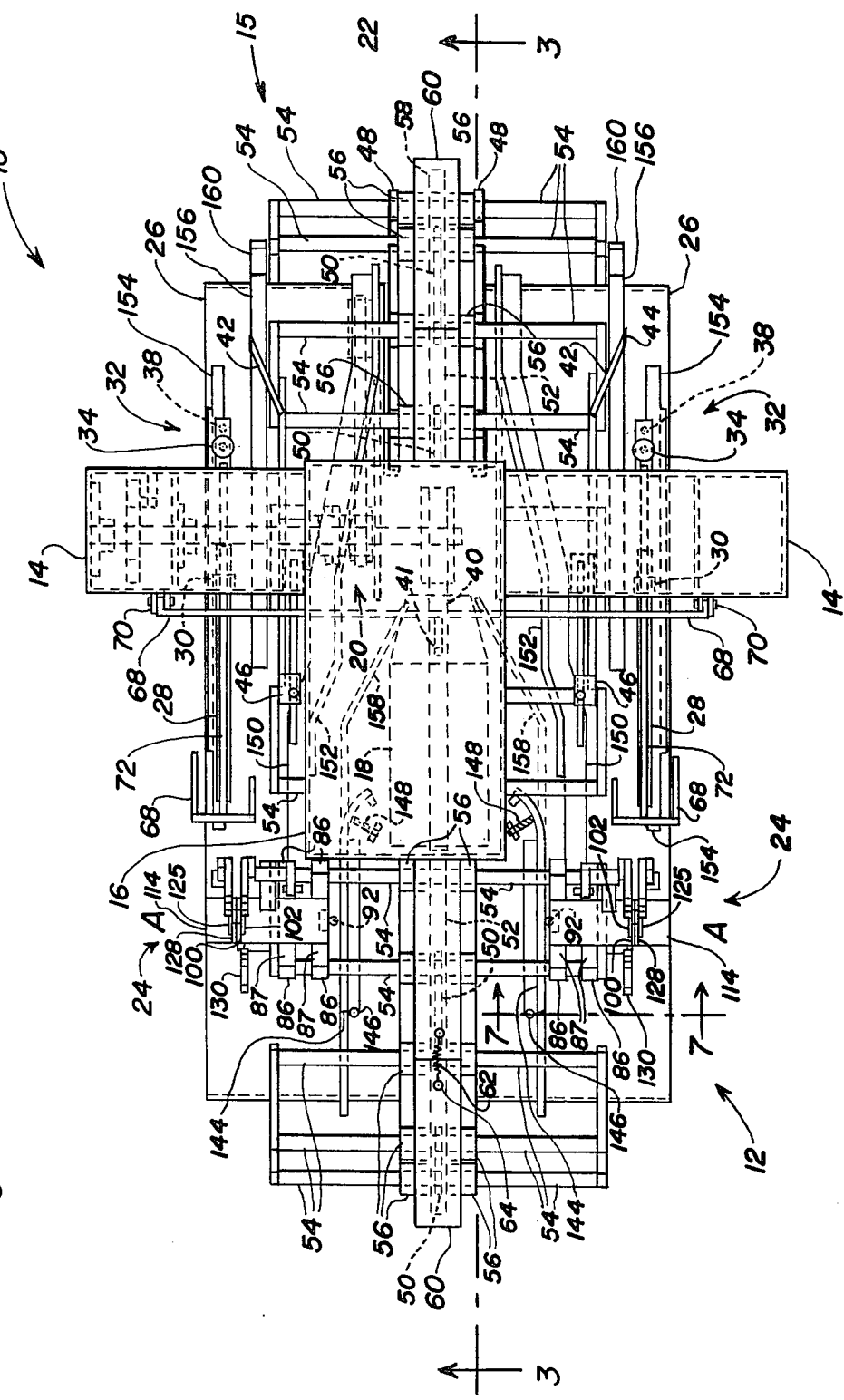
FIG. 2 is generally a top plan view of the machine as shown in FIG. 1, with, however, one set of the operational head assemblies removed therefrom for purposes of greater clarity.

Referring to FIG. 2, which is a top plan view of machine 10 as seen in FIG. 1, a visual perspective of the laterally identical operational and operator sides thereof is shown. The operational head assembly 24 loading position A for the respective operational sides of said machine 10 is also shown, in addition to a plan view of certain of the various cam configurations by which the cam activated operational head assemblies 24 function, the same of which will be described in detail during discussions hereinafter of certain subsequent Figures.

In FIG. 3 an enlarged side sectional elevation of the machine 10 operational assembly 15, and more particularly the operational assembly conveyor 22 thereof as hereinbefore discussed, is shown. Specifically illustrated is the conveyor tension adjustment and set bolt 66 and the compressive/tension relation thereof to the operational assembly conveyor 22.

The view seen in FIG. 4 is an enlarged section of the operational assembly conveyor 22 as seen along the line 4—4 of FIG. 3, showing in that section the communication of a conveyor track guide roller 56 with the conveyor track 58, in addition to the compressive communication of a "floating" conveyor track cover member 60 with a conveyor track guide roller 56, as well as also showing in the operational assembly conveyor 22 structure pivotal connection of a bar member 50 and a block member 52 by means of a connecting rod 54 which serves as an axle for said conveyor track guide roller 56, and further showing in phantom the respective positioning of laterally opposite operational head assemblies 24, affixed to connecting rods 54, at the loading position A locations.

In FIG. 5 a second enlarged section of the operational assembly conveyor 22 as seen along line 5—5 of FIG. 3 is shown, providing not only additional detail of the operational assembly cover 22 as previously discussed, but also more specifically showing the channel sprocket wheel 48 and the engagement thereof with connecting rod 54 whereby motion is imparted from the operational assembly drive train 20 to said operational assembly conveyor 22.

In order to more clearly provide a detailed explanation of how the operational head assemblies 24 accomplish anatomical section de-boning, attention is next directed to FIG. 6, wherein an enlarged end elevation of an operational head assembly 24 is shown in an extended position. It will be noted that said operational head assembly 24 is comprised of two respective sub-assemblies, being a rear (machine side) operational head element 82 and a forward (operator side) operational head element 84. Considering first a discussion and description of the rear operational head element 82 as shown in FIG. 6.

The rear operational head element 82 is slidably installed by means of two sets of bushings 86 upon adjacent connecting rods 54 pivotally assembled through respective ends of block members 52 as shown in FIG. 1 and FIG. 2. Connecting each set of said bushings 86 are respective connecting bars 87 which in turn are assembled to a support plate 88 providing a rear operational head element mounting member to which the extending cam follower support post 90 supporting the extending cam follower 92 is affixed, the rear "V-notch" cutting clamp follower support post 94 supporting the rear "V-notch" cutting clamp cam follower 96 is also affixed, in addition to having affixed thereto the rear "V-notch" cutting clamp cam-linkage pivot support 98 and the rear "V-notch" saddle clamp 100.

The main functional de-boning element of said rear operational head element 82, however, is the rear "V-notch" cutting clamp 102, which is pivotally connected to the rear "V-notch" cutting clamp cam follower 96, through said rear "V-notch" cutting clamp cam-linkage pivot support 98, by means of link arm 104 which is pivotally connected to rocker arm 106 being in turn pivotally connected through pivot pin 108 pivotally to the rear "V-notch" cutting clamp cam follower slide 110.

Upon engagement of the aforementioned extending cam follower 92 with a cam surface as will hereinafter be described, the rear operational head element 82 is caused to laterally extend or contract, with respect to the laterally stationary forward operational head element 84, reciprocally along respective connecting rods 54 to which said rear operational head element 82 is slidably assembled.

Upon engagement of the aforementioned rear "V-notch" cutting clamp cam follower 96 with a cam surface as will hereinafter be described, the rear "V-notch" cutting clamp 102 is caused to close or open with respect to the rear "V-notch" saddle clamp 100.

Considering now a discussion and description of the forward operational head element 84 as shown in FIG. 6, the forward operational head element 84 is fixedly assembled, after slidably installing said rear operational head element 82 as heretofore described, upon the terminal ends of adjacent connecting rods 54 by means of inserting bolts 112 through openings in the forward operational head element mounting bracket 114 and threadably engaging said bolts in coaxial threaded openings provided in the terminal ends of said connecting rods 54. Assembled to the forward operational head element mounting bracket 114 is the peeling blade cam follower support post 116 supporting the peeling blade cam follower 118, the forward operational head element hold-down cam follower support post 120 supporting the forward operational head element hold-down cam follower 122, in addition to having affixed thereto the forward "V-notch" engaging clamp pivot mount 124 which pivotally supports the forward "V-notch" engaging clamp 125, the forward "V-notch" engaging clamp tension spring 126, and the forward "V-notch" saddle clamp 128.

The main functional de-boning elements of said forward operational head element 84, however, are the pair of detented peeling blades 130, which are respectively pivotally connected to the bottom lateral sides of said peeling blade cam follower support post 116 by pivot mounts 132 and therefrom pivotally connected to the peeling blade cam follower 118 by means of link rods 134 pivotally connecting the respective pivot mount arms 136 pivotally to the peeling blade cam follower slide 138 connecting glanges 140.

Upon engagement of the aforementioned peeling blade cam follower 118 with a cam surface as will hereinafter be described, the respective detented peeling blades 130 are caused to arcuately close and provide a peeling surface for removal of meat from an appendicular anatomical section section during de-boning operations. Engagement of the aforementioned forward operational head element hold-down cam follower 122 with a hold-down cam surface stabilizes the forward operational head element 84 during de-boning operations.

Upon engagement of the aforementioned forward "V-notch" engaging clamp 125 cam follower 142 with the overhead "shoe cam" as will hereinafter be described, said forward "V-notch" engaging clamp 125 is caused to close with respect to the forward "V-notch" saddle clamp 128.

Figure 7:
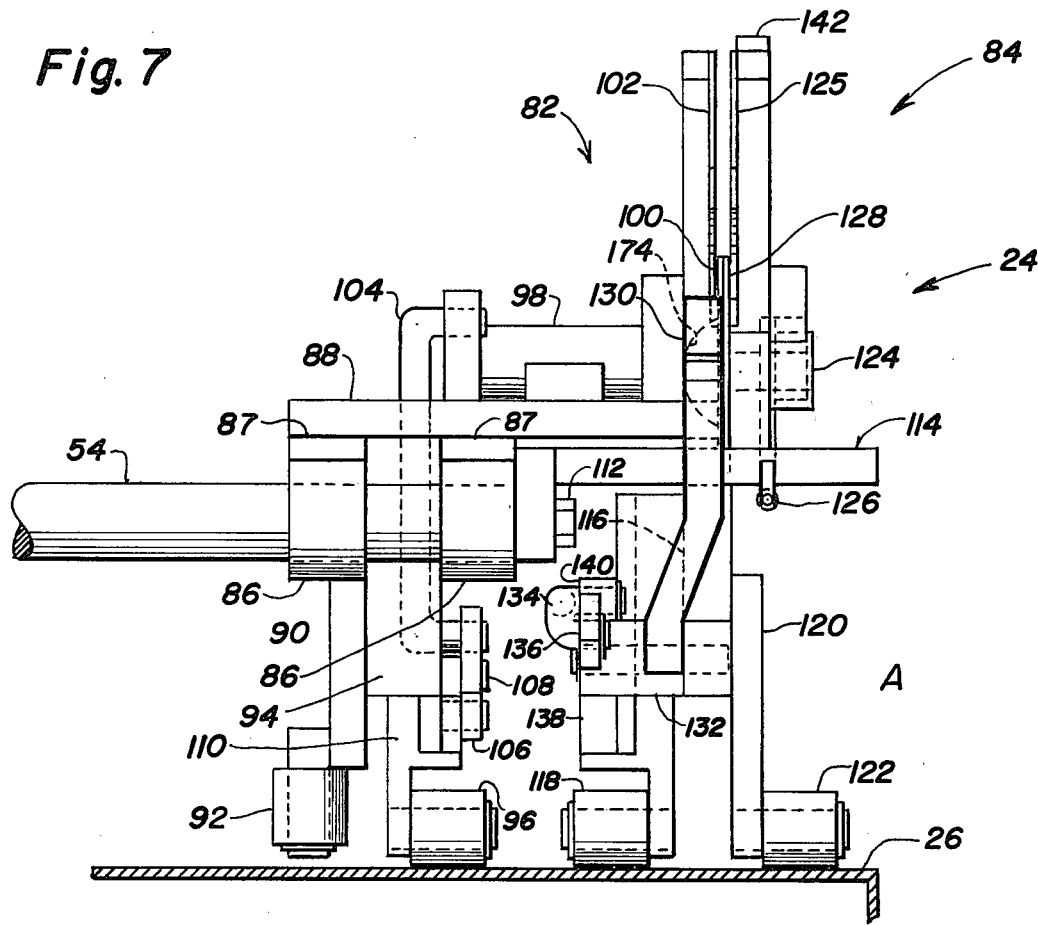
FIG. 7 is an enlarged end view of an operational head in the contracted position.

The view seen in FIG. 7 corresponds to that as seen in FIG. 6, excepting the rear operational head element 82 and forward operational head element 84 of the operational head assembly 24 are shown in the contracted loading position A configuration.

Figure 8:
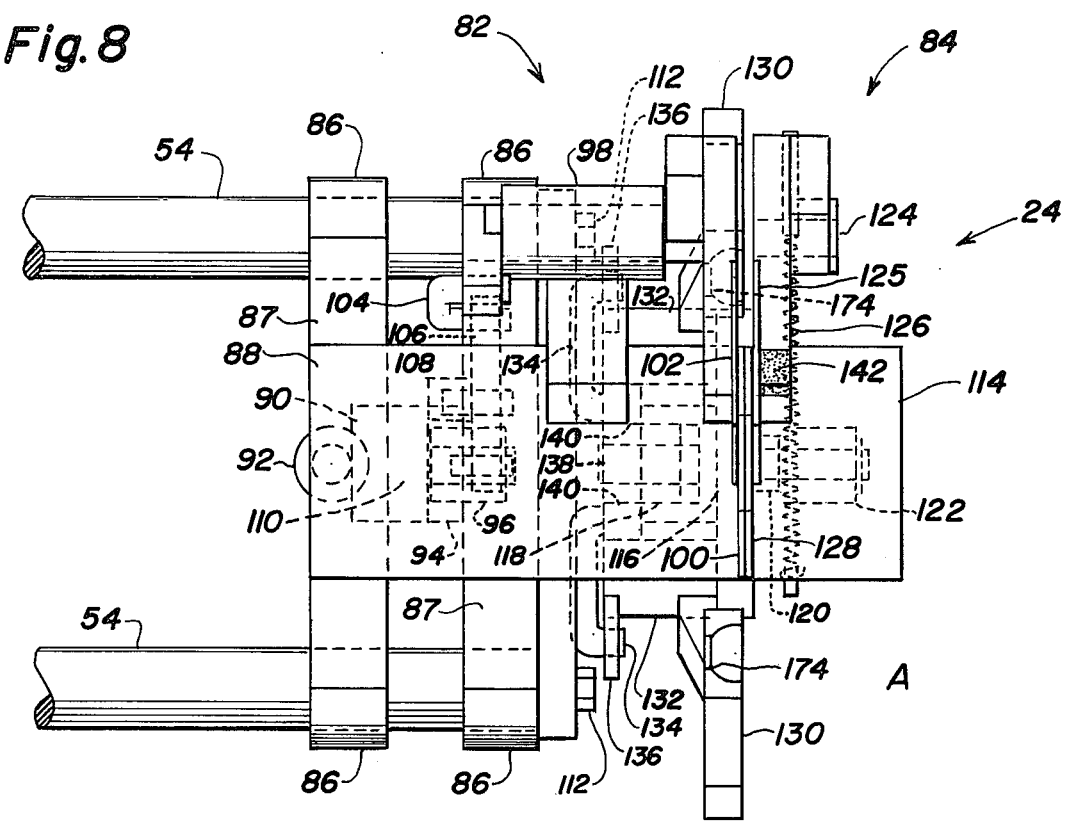
FIG. 8 is an enlarged top plan view of an operational head in the contracted position.

The illustration shown in FIG. 8 is a top plan view of that as seen in FIG. 7, also detaining the operational head assembly 24 in the contracted loading position A configuration.

Considering concurrently the respective illustrations shown in FIG. 9 and FIG. 10, the illustration shown in FIG. 9 is a top plan view of a cam table 26 of machine 10, wherein is seen the relative configurations of the respective cams by which said operational head assemblies 24, by engagement of the respective cam followers thereof, are cycled to provide automatic de-boning of appendicular anatomical sections. The illustration shown in FIG. 10 is a side elevation of the view seen in FIG. 9, wherein is seen the relative elevations of the aforementioned cams. The respective cams will additionally be considered in association with the respective cam followers of an operational head assembly 24, starting at the operational head assembly loading position A with the operational head assembly 24 in the contracted clamp open configuration as illustrated respectively in FIG. 7 and FIG. 8. It is to be remembered during the following discussion that in accomplishing de-boning operations the rear operational head element 82 is slidably assembled upon adjacent connecting rods 54 as previously described and moves with lateral reciprocal motions as regards machine 10, whereas the forward operational head element 84 is fixedly assembled to the terminal ends of adjacent connecting rods 54 as previously described and is stationary with respect to lateral motion as regards machine 10.

Starting at loading position A, the first cam is the operational head assembly registration guide cam 144, which is engaged by the machine side of the extending cam follower 92 of the rear operational head element 82 whereby the rear operational head element 82 of the operational head assembly 24 is laterally registered with respect to the forward operational head element 84 thereof respectively in the contracted clamp open configuration and said operational head assembly 24 is positioned for loading. It should be noted that said operational head assembly registration guide cam 144 is pivotally mounted at pivot point 146 and backed by a compression spring 148 to provide shock absorption during operational head assembly registration and loading.

The second cam is a combination cam, being comprised initially of the rear "V-notch" cutting clamp cam 150 which is engaged by the rear "V-notch" cutting clamp cam follower 96 of the rear operational head element 82, and being comprised secondly of the extending cam 152 which is engaged on the machine side thereof by the operator side of the extending cam follower 92 of the rear operational head element 82, said combination cam 150/152 providing the cam activated operational de-boning functions accomplished by the rear operational head element 82.

The third cam is the forward operational head element hold-down cam 154 which is engaged by the forward operational head element hold-down cam follower 122 of the forward operational head element 84, and provides cammed stabilization of said forward operational head element 84 during de-boning operations and otherwise provides no de-boning operational function per se.

The fourth cam is the overhead "shoe cam" 28 as previously discussed, which is engaged by the cam follower 142 of the forward "V-notch" engaging clamp 125 of the forward operational head element 84, and provides clamped engagement of the appendicular anatomical section bone member during initial de-boning operations.

The fifth cam is the peeling blade cam 156 which is engaged by the peeling blade cam follower 118 of the forward operational head element 84, and provides cam activated operational meat peeling functions accomplished by the forward operational head element 84 during de-boning functions.

The sixth cam is the rear operational head element return cam 158 which is engaged by the machine side of the extending cam follower 92 of the rear operational head element 82 whereby the rear operational head element 82 of the operational head assembly 24 is laterally returned with respect to the forward operational head element 84 thereof for lateral contracted registration of said operational head assembly 24 at loading position A, and thus the cammed functions of an operational head assembly cycle are completed.

It should be noted that the rail 160 is a guide means for the forward operational head elements 84 during the conveyable transport thereof from the operational assembly 15 area to and initially through an inverted return configuration.

The respective views shown in FIGS. 11 -15 are illustrative of various operational head assembly configurations at certain cam positions. For ease of reference and explanation, the various cam function positions as shown on FIG. 9 with regard to lateral cam configuration, which correspond to the FIG. 10 cam function positions with regard to cam elevation, are referenced lettered serially from load position A through position H as indicated on FIG. 9.

The view as seen in FIG. 11 is a front elevation of the forward operational head element 83 as it would appear in transit through loading position A, showing the respective clamp members thereof in the open configuration for loading. The view as seen in FIG. 12 is a rear elevation of the forward operational head element 84 as shown in FIG. 11. The FIG. 13 view illustrates a rear elevation of the forward operational head element 84 as it would appear in operational transit through position H, with the detented peeling blades 130 thereof cammed into closed position by compressive engagement of the peeling blade cam follower 118 with the elevated surface of the peeling blade cam 156.

The view as seen in FIG. 14 is a front elevation of the rear operational head element 82 as it would appear in operational transit through loading position A, showing the clamp member thereof in the open configuration for loading. The FIG. 15 view illustrates also a front elevation of the rear operational head element 82, but, however, as it would appear in operational transit through position D, with the rear "V-notch" cutting clamp 102 thereof cammed into closed position by compressive engagement of the rear "V-notch" cutting clamp follower 96 with the elevated surface of the rear "V-notch" cutting clamp cam 150.

Lastly, the series of schematic illustrations show, in FIGS. 16a and b through 23a and b, the a series of Figures being sequential top plan views of the machine 10 operational head assembly 24 de-boning cycle of a typical appendicular anatomical section 162, and the b series of Figures being the operator side elevation views respectively corresponding to the aforementioned a series. In the subject series of Figures, a typical appendicular anatomical section 162 as shown therein is comprised of an elongated meat encased bone shaft 164 having a large protuberance 166 at one end thereof and a small protuberance 168 an the other end thereof, with the bone encasing meat designated as 170. It will also be noted that the FIG. 9 cam function reference letters are also indicated as appropriate on the respective FIGS. 16-23, thereby more readily enabling an association of the operational head assembly configuration and the de-boning function being performed thereby with the respective cam positions. It is to be understood that the descriptions herein following refer to the respective de-boning functions performed by machine 10 while said machine 10 is continuously running at operational speed. The operational sequence of the de-boning cycle of said machine 10, sequentially accomplished while said machine 10 is running at operational speed, is as follows:

As shown respectively in FIGS. 16a and b, a typical appendicular anatomical section 162 for de-boning is manually positioned, i.e., "hand loaded on the fly" at loading position A, during which the operational head assembly 24 is cammed to the contracted open clamp configuration. The elongated meat encased bone shaft 164 of said appendicular anatomical section 162 is loaded so that the large protuberance 166 thereof is machine inward of the rear "V-notch" saddle clamp 100 of the rear operational head element 82. During hand loading of said operational head assembly 24, the respective loading operators insure that any meat in the proximity of the large protuberance 166 is pushed back along the elongated meat encased bone shaft 164 by employing the forward "V-notch" saddle clamp 128 as a push-plate to accomplish the same while loading.

As the operational head assembly 24 is conveyably transported forward from loading position A the rear "V-notch" cutting clamp 102 of the rear operational head element 82 is cammed into closed position with respect to the rear "V-notch" saddle clamp 100, as respectively shown in FIGS. 17a and b, by progressively compressive engagement of the rear "V-notch" cutting clamp cam follower 96 with the rear "V-notch" cutting cam 150 along the elevation incline thereof at position B, thereby securely engaging said appendicular anatomical section 162 within the operational head assembly 24 for subsequent automatic de-boning operations. Concurrently, the forward operational head element hold-down cam follower 122 engages the forward operational head element hold-down cam 154 thus providing stabilization of the operational head assembly 24 during de-boning operations.

Continued forward transport of the operational head assembly 24 brings the cam follower 142 of the forward "V-notch" engaging clamp 125 into contact with the overhead "shoe cam" 28 along position C thereof, thereby causing the forward "V-notch" engaging clamp 125 of the forward operational head element 84 to close with respect to the forward "V-notch" saddle clamp 128 and severably engage the bone encasing meat 170 as respectively shown in FIGS. 18a and b, cutting said meat 170 to the bone shaft 164 annularly thereabout.

The de-boning functions respectively illustrated in FIGS. 19a and b are comprised of multiple cammed actions, being, while the annular cut dwell aforementioned is maintained the extending cam follower 92 of the rear operational head element 82 engages the extending cam 152 along position D, thereby causing laterally displaced movement of the rear operational head element 82 with respect to the forward operational head element 84 and a resultant scraping of the bone shaft 164 in the vicinity thereof immediately inward of the large protuberance 166 for a distance of approximately one-half inch. Immediately thereafter, position E on the overhead "shoe cam" 28 is obtained by the forward "V-notch" engaging clamp 125 cam follower 142, thereby withdrawing the depth of cut thereof while the position D lateral displacement movement of said rear operational head element 82 continues to position F. The result of the foregoing operational sequence is that a circumferential meat membrane 172 remains with any bone scrapings on the bone shaft 164, in addition to there being the initiation of a tissue bushing formation about said bone shaft 164, which tissue bushing formation thereafter enables a clean peelable removal of the bone encasing meat 170.

Figure 20A:
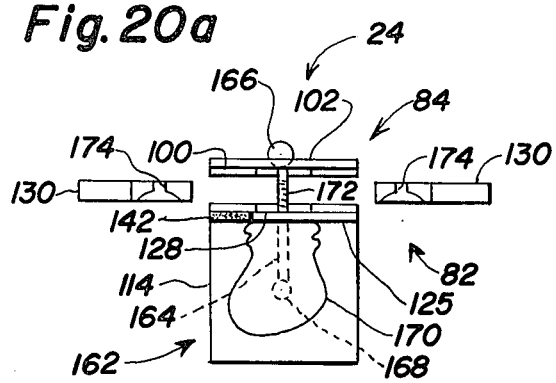
FIG. 20a and FIG. 20b illustrate respectively a simplified top plan view and a front elevation view of the operational head clamping and peeling blade assemblies as would be the configurations thereof at cam position E as seen in FIG. 9.
Figure 20B:
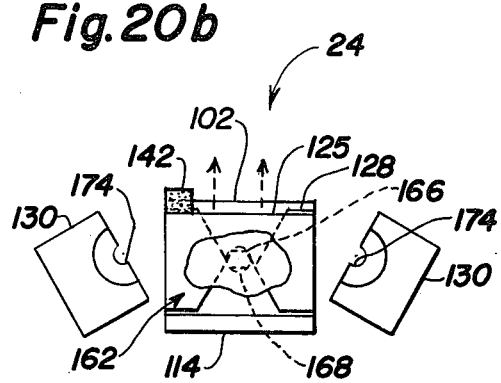

The respective illustrations in FIGS. 20a and b further show the heretofore described tissue bushing formation upon said bone shaft 164 during the respective cam follower transits through completion of positions D and E.

Figure 21A:
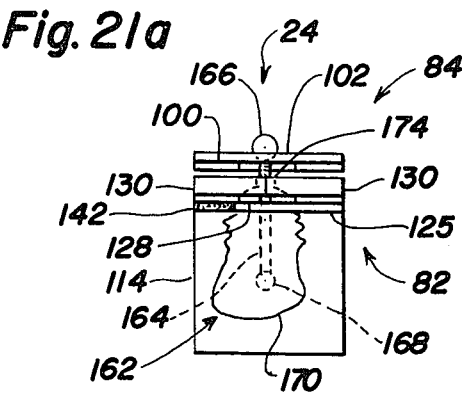
FIG. 21a and FIG. 21b illustrate respectively a simplified top plan view and a front elevation view of the operational head clamping and peeling blade assemblies as would be the configurations thereof at cam position F as seen in FIG. 9.
Figure 21B:
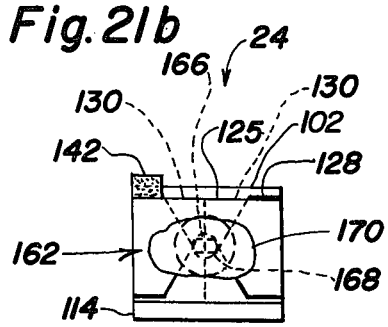

As the operational head assembly 24 approaches position F, as respectively illustrated in FIGS. 21a and b, the rear operational head element 82 enters and maintains a neutral motion condition while the peeling blade cam follower 118 engages the elevating incline section F of the peeling blade cam 156, thereby causing progressively compressive engagement of said peelig blade cam follower 118 and closing of the detented peeling blades 130. Concurrently, the cam follower 142 of the forward "V-notch" engaging clamp 125 traces towards position G on the overhead "shoe cam" 28 while the forward "V-notch" engaging clamp tension spring 126 causes said forward "V-notch" engaging clamp 125 to commence opening.

Figure 22A:
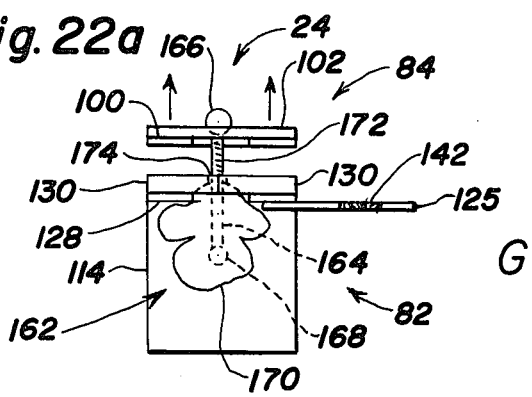
FIG. 22a and FIG. 22b illustrate respectively a simplified top plan view and a front elevation view of the operational head clamping and peeling blade assemblies as would be the configurations thereof at cam position G as seen in FIG. 9.
Figure 22B:
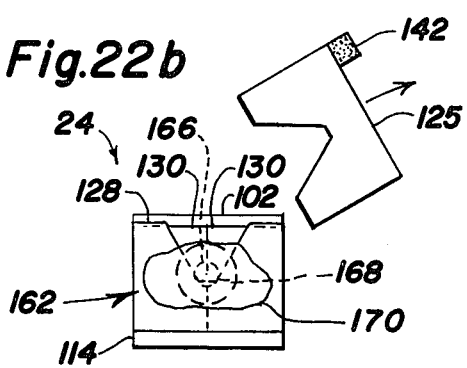

As seen respectively in FIGS. 22a and b, the forward "V-notch" engaging clamp 125 has obtained position G and fully opened, the detented peeling blades 130 are fully closed, and the extending cam follower 92 engages the G position trace of the extending cam 152 thereby re-initiating lateral displacement movement of the rear operational head element 82 relative to the forward operational head element 84, thereby implementing and completing an inverse peelable de-boning of the bone encasing meat 170 by means of shaped detented blade tissue bushing removal and by peelably inverting the bone encasing meat back over the small protuberance 168 of the bone which passes through the bisected peeling blade opening 174.

The respective views shown in FIGS. 23a and b illustrate the final de-boning operation per se, being that of severing any remaining meat-to-bone connective tendon or tissue 176, which is automatically accomplished by means of the knife blade 44 of the tendon severing knife 42 as shown.

The operational head assembly 24 continues forward and the rear "V-notch" cutting clamp 102 is cammed open as the rear "V-notch" cutting clamp cam 150 returns to a relative cam table elevation, thereby releasing the spent bone therefrom. The detented peeling blades 130 are cammed open at the end of the peeling blade cam 156, thereby releasing the de-boned meat. As the extending cam follower 92 engages the rear operational head element return cam 158, the operational head assembly 24 is contracted to the open clamp configuration for re-registration, re-loading, and re-cycling from position A.

The foregoing description illustrates preferred embodiments of our invention. However, the concepts employed may, based upon such description, be employed in other embodiments without departing from the scope of the invention. Accordingly, the following claims are intended to protect the invention broadly, as well as in the specific forms shown herein.

We claim:
1. A machine operable automatically to simultaneously debone individually a similar plurality of appendicular anatomical sections of a small edible animal and deliver therefrom respectively separated a meat component and a bone component, said machine comprising in combination:
   a. a longitudinally disposed support frame having interconnected horizontal and vertical members,
   b. an infeed end and a delivery end respectively positioned at the opposite longitudinally disposed ends of said machine,
   c. a chain connected drive train having sprocket members mounted upon rotatably transverse shafts supportably positioned in said frame in longitudinally and vertically spaced relationship intermediate the infeed end and the delivery end of said machine and interconnectably communicating to rotatably drive a channel sprocket member mounted upon a rotatably transverse shaft said channel sprocket member being positioned in said frame intermediate of the lateral sides thereof and inward of the delivery end of said machine,
   d. a longitudinally disposed endless conveyor extending around said channel sprocket and longitudinally disposed vertically spaced track means supportably positioned intermediate the lateral sides of said frame to provide vertically disposed upper and lower longitudinal guiding support spans for said conveyor,
   e. drive means supported on said frame and interconnected by chain to one of said sprocket members of said drive train and operable to rotate said channel sprocket and thereby rotatably transport said conveyor in fixed unidirectional endless motion from said infeed end to said delivery end of said machine,
   f. a plurality of regularly spaced longitudinally disposed conveyor member connecting rods extending respectively perpendicularly outward either side from said conveyor said rods adapted to receive upon adjacent pairs thereof on either lateral side of said conveyor a plurality of planetery operational head assemblies adapted to receive and clampably engage said appendicular anatomical sections individually,
   g. de-boning means operable by engagement of cam follower means on said operational head assemblies with cam means supportably configured upon said frame on either lateral side of said conveyor so that during transport of said conveyor from said infeed end to said delivery end of said machine adjacent said vertically disposed upper longitudinal guiding support span thereof said meat component of said appendicular anatomical sections is individually and successively inversely removed from said bone component, h. cutting means respectively positioned either lateral side of said frame at the delivery end of said machine to automatically sever meat component to bone component retaining tissue, and i. means to respectively discharge said meat component and said bone component separately at said delivery end of said machine.

2. The machine according to claim 1 in which said conveyor is comprised of an alternating plurality of longitudinally configured bar and block members pivotally interconnected one to the other at the respective longitudinal ends thereof by said connecting rods.

3. The machine according to claim 1 in which regularly spaced detents about the peripheral circumference of said channel sprocket rotatably engage said connecting rods centrally intermediate of the ends thereof and thereby impart motion to said conveyor.

4. The machine according to claim 3 in which the peripheral circumferential center-to-center distance between said regularly spaced detents is equivalent to the center-to-center distance between said connecting rods.

5. The machine according to claim 4 in which said channel sprocket is comprised of two parallel transversely spaced circumferentially circular members rigidly affixed to a hub centrally intermediate of said parallel transversely spaced circumferentially circular members.

6. The machine according to claim 1 in which said operational head assemblies are detachably affixed to said connecting rods.

7. The machine according to claim 1 further including a first elongated cam guide means parallel to said upper longitudinal guiding support span, cam follower means on said operational heads engagable with said first cam guide means to accurately position said operational heads for movement along a predetermined path from the infeed to the delivery end of said machine.

8. The machine according to claim 1 further including an elongated hold-down cam guide means parallel to said upper longitudinal guiding support span, cam follower means on said operational heads engagable with said hold-down cam guide means to accurately maintain said operational heads in vertical alignment during movement along a predetermined path from the infeed to the delivery end of said machine.

9. The machine according to claim 1 further including a conveyor tension adjustment and set means comprised of a tension bolt and lock nut assembly.

10. The machine according to claim 1 further including a conveyor cover means comprised of a floating assembly wherein the vertically disposed upper and lower members thereof are connected to a U-shaped infeed end member thereof by retainable engagement provided by a set of upper and lower cover member tension springs removably assembled to spring retaining pins respectively affixed to the vertically disposed upper and lower member infeed ends and the upper and lower infeed ends of said U-shaped infeed end member.

11. The machine according to claim 1 in which said cutting means are comprised of a set of knife blades respectively counterbalanced to provide proper blade resistance whereby said retaining tissue between said meat component and said bone component is effectively severed.

12. The machine according to claim 1 further including a plurality of pliable extensions stationarily positioned at the discharge end of said machine so as to engage and remove from any operational head any retained meat component during conveyable transit therethrough.

13. The machine according to claim 1 further including a plurality of pliable extensions stationarily positioned at the discharge end of said machine so as to engage and remove from any operational head any retained bone component during conveyable transit therethrough.

14. The machine according to claim 1 further including a second elongated cam guide means angularly led into being parallel to said lower longitudinal guiding support span, cam follower means on said operational heads engagable with said second cam guide means to automatically close said operational heads after de-boning operations.

15. A machine for de-boning appendicular anatomical sections of small edible animals comprising on combination:

a. a conveyor movable between infeed and delivery ends of said machine, b. connecting rods extending respectively perpendicularly outward either side of said conveyor, c. a plurality of reciprocating operational head assemblies adapted to be removably affixed to adjacent pairs of said connecting rods and individually support a appendicular anatomical section of small edible animals thereon for movement along a predetermined path, d. cam means mounted adjacent said path engagable with cam followers on said operational head assemblies operable to sequentially cycle blade means of said operational head assemblies to first sever and then inversely remove by a peeling action the meat component of said appendicular anatomical sections from the bone component thereof without either shattering said bone component or contaminating said meat component with bone fragments, e. tendon-severing means supported adjacent said path and positioned to sever meat component-to-bone component tendons automatically, f. meat component removal means operable to engage and individually remove said meat components from said operational head assemblies automatically upon completion of de-boning operations, and g. bone component removal means operable to engage and individually remove said bone components from said operation head assemblies automatically upon completion of de-boning operations.

16. The machine according to claim 15 in which said operational head assemblies are comprised of a forward operational head element and a rear operational head element.

17. The machine according to claim 16 in which said rear operational head element is slidably assembled upon adjacent pairs of said connecting rods and adapted to be reciprocally movable thereon.

18. The machine according to claim 16 in which said forward operational head element is statically assembled upon said adjacent pairs of said connecting rods respectively at the outer transverse ends thereof by bolt means.

19. The machine according to claim 17 in which said rear operational head element is provided with a first set of V-notch clamp means.

20. The machine according to claim 19 in which said first set of V-notch clamp means is comprised of a first lower stationary upward facing V-notch saddle clamp and a first pivotally communicating overhead downward facing V-notch cutting clamp.

21. The machine according to claim 20 in which said first pivotally communicating overhead downward facing V-notch cutting clamp is pivotally operable to open and close by compressive engagement of a first cam follower means with a first cam means during operational head assembly transit by said conveyor from the infeed to the delivery end of said machine.

22. The machine according to claim 19 in which said first set of V-notch clamp means is adapted to receive and engage the bone end of an appendicular anatomical section for de-boning immediately inward of the larger protuberance thereon.

23. The machine according to claim 18 in which said forward operational head element is provided with a second set of V-notch clamp means.

24. The machine according to claim 23 in which said second set of V-notch clamp means is comprised of a second lower stationary upward facing V-notch saddle clamp and a second pivotally communicating overhead downward facing V-notch cutting clamp.

25. The machine according to claim 24 in which said second pivotally communicating overhead downward facing V-notch cutting clamp is pivotally operable to close by compressive engagement of a second cam follower means with a second cam means during operational head assembly transit by said conveyor from the infeed to the delivery end of said machine.

26. The machine according to claim 23 in which said second set of V-notch clamp means is adapted to receive and engage the bone end of an appendicular anatomical section for de-boning next immediately inward of the larger protuberance thereon and while so engaged by means of inward traversing displacement of said rear operational head element by engagement of a third cam follower means with a third cam means during operational head assembly transit by said conveyor from the infeed to the delivery end of said machine successively cause first a scraping of the shaft of said bone and second the initiation of an inverse peelable removal of the bone encasing meat of said appendicular anatomical section from said bone over a length of less than half of the total length of the bone shaft.

27. The machine according to claim 18 in which said forward operational head element is further provided with a set of detented peeling blades.

28. The machine according to claim 27 in which said set of detented peeling blades are respectively provided with a bisected peeling blade opening wherein said openings registerably communicate upon pivotal closing of said detented peeling blades.

29. The machine according to claim 28 in which said set of detented peeling blades are pivotally operable to close by compressive engagement of a fourth cam follower means with a fourth cam means during operational head assembly transit by said conveyor from the infeed to the delivery end of said machine.

30. The machine according to claim 29 in which said set of detented peeling blades are adapted to receive and complete an inverse peelable removal of said bone encasing meat of said appendicular anatomical section from said bone by means of further inward traversing displacement of said rear operational head element thereby inversely pushing said encasing meat around and beyond the bone end having the smaller protuberance thereon.

31. A method of de-boning appendicular anatomical sections of small edible animals without bone fiber contamination, said method comprising placing said appendicular anatomical sections individually in a plurality of operational head assemblies having clamping and peeling blades during continual conveyable transport thereof, annularly clamping said appendicular anatomical sections with a first clamping means immediately inward of the larger protuberance of the bone member thereof, annularly clamping said appendicular anatomical sections with a second clamping means next immediately inward of the larger protuberance of the bone member thereof, transversely displacing said first clamping means relative to said second clamping means to successively cause said second clamping means to first scrape the shaft of said bone and secondly initiate an inverse peelable removal of the bone encasing meat of said appendicular anatomical section upon a slight opening of said second clamping means thereby further causing the formation of an annular meat bushing film about said bone shaft from the point of the beginning of said scraping over a length of less than half of the total length of said bone shaft, annularly engaging said bone shaft by a set of detented peeling blades and withdrawing, said second clamping means, further transverse displacing of said first clamping means relative to said detented peeling blades thereby inversely pushing said encasing meat around and beyond the bone end having the smaller protuberance thereon, severomg any meat-to-bone retaining tissue, and discharging the separate meat and bones containers.

* * * * *

UNITED STATES PATENT AND TRADEMARK OFFICE
CERTIFICATE OF CORRECTION

PATENT NO. : 4,041,572
DATED : August 16, 1977
INVENTOR(S) : Eugene G. Martin; Dale M. Risser It is certified that error appears in the above-identified patent and that said Letters Patent are hereby corrected as shown below:

Column 2, line 6: Insert a --,-- between "blades" and "effect".

Column 18, line 51: Delete "containers".

Signed and Sealed this

Fourteenth Day of February 1978

[SEAL]

Attest:

RUTH C. MASON
Attesting Officer

LUTRELLE F. PARKER
Acting Commissioner of Patents and Trademarks